Oct. 17, 1967     E. J. BICEK     3,347,761
ELECTROPURIFICATION OF SALT SOLUTIONS
Filed Jan. 22, 1964
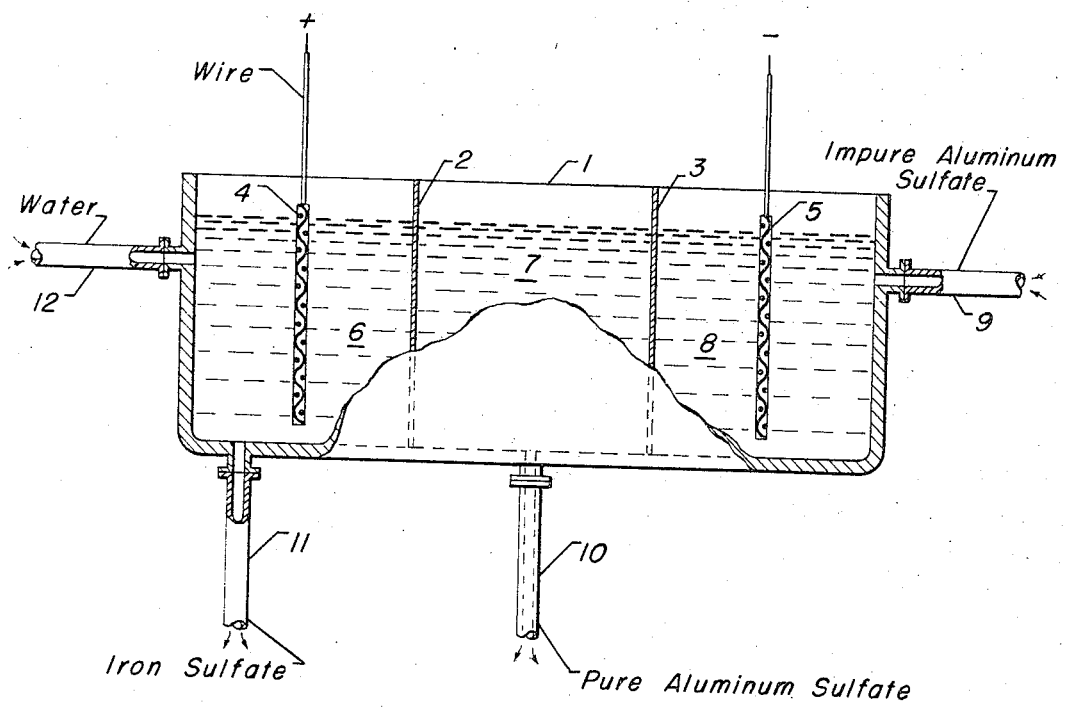
INVENTOR:
Edward J. Bicek
BY:
James R. Hoatson Jr.
Philip T. Liggett
ATTORNEYS United States Patent Office 3,347,761
Patented Oct. 17, 1967

3,347,761
ELECTROPURIFICATION OF SALT SOLUTIONS
Edward J. Bicek, La Grange, Ill., assignor to Universal Oil Products Company, Des Plaines, Ill., a corporation of Delaware
Filed Jan. 22, 1964, Ser. No. 339,501
8 Claims. (Cl. 204—151)

This invention relates to the electrolytic purification of salt solutions and more particularly to a process for removing an electrolytically reducible metallic contaminant from an impure aqueous salt solution containing stable cations and said contaminant. The process is carried out in a direct electrolysis cell employing a permselective membrane.

Electroseparation of two or more cationic constituents of a solution by direct electrolysis is frequently desirable because of its low operating cost in comparison to chemical separation techniques. Electrolysis methods heretofore employed have the disadvantage that large quantities of impurities are introduced into the solution one is attempting to purify by anodic attack on the material of the anode. If the anode is carbon or graphite, the product becomes contaminated with colloidal carbon. If the anode is magnetic iron oxide, a commercially recommended material, it dissolves at a serious rate and limits the extent of purification possible. Tantalum electrodes have excessively high overvoltages and become nonconductors for all practical purposes. Even an "inert" electrode such as platinum dissolves at a rate which makes the replacement of anodes costly and leaves platinum as a contaminant in the product solution.

The present invention eliminates contamination by anodic attack and affords an easily executed separation process of high efficiency and low operating cost. The process is effected in a 3-compartment cell containing a sacrificial metal anode which is separated from the cathode by a cation exclusion barrier or membrane and a neutral semipermeable membrane interposed between the cation barrier and the cathode. The salt solution to be purified is charged to the cathodic compartment wherein the metallic contaminant is reduced to the metallic state and either plates out on the cathode or flakes off the cathode to the bottom of the compartment, depending upon the particular metal and conditions utilized. Stable or non-reducible cations migrate through the neutral barrier into the central compartment under the combined influence of a concentration gradient therebetween and physical flow of the solution, while salt anions are driven through the neutral barrier by electric potential as well as by the above effects. In the anodic compartment, the sacrificial metal anode is electrolytically oxidized and goes into solution, but the cations so formed are prevented from migrating into the central compartment by the cation exclusion membrane. Salt anions in the central compartment are, however, free to pass through the cation exclusion membrane into the anodic compartment. A purified salt solution of reduced contaminant concentration is withdrawn from the central compartment.

It is, therefore, a broad embodiment of this invention to provide a process for removing an electrolytically reducible metallic contaminant from a raw aqueous liquor containing a major proportion of electrolytically stable cations and a minor proportion of said contaminant in ionic form which comprises maintaining spaced electrodes including a sacrificial metal anode and a cathode immersed in an aqueous electrolyte and separated by a first cation impervious barrier and a second neutral semipermeable barrier interposed between said first barrier and said cathode whereby to form anodic, intermediate and cathodic zones; introducing said raw liquor to the cathodic zone and passing it first into contact with the cathode and then through said second barrier into the intermediate zone; applying an electric potential to said electrodes thereby electrolytically reducing said contaminant to the metallic state in the cathodic zone and oxidizing said sacrificial anode in the anodic zone, the potential migration into said intermediate zone of cations thus liberated in the anodic zone being substantially impeded by said first barrier; and withdrawing from said intermediate zone purified liquor of reduced contaminant content.

The process may be employed to purify any metal contaminated water-soluble salt, inorganic or organic, which comprises an electrolytically stable cation but wherein the contaminant is electrolytically reducible. The term "electrolytically stable," as employed herein, means that the stable cation undergoes no appreciable cathodic reduction to the metal in aqueous solution whereas the metal contaminant is so reduced. Examples of stable cations are the ammonium ion, quaternary ammonium ions, and the ions of elemental metals having standard oxidation potentials exceeding about +1.50 volts, referred to the hydrogen-hydrogen ion couple as zero, and measured at unit activities and a temperature of 25° C. As reported in the Handbook of Chemistry and Physics, 39th edition, (1958) pp. 1633, these elemental metals include lithium, sodium, potassium, rubidium, cesium, beryllium, magnesium, calcium, strontium, barium, radium, aluminum, scandium, yttrium, lanthanum, titanium, zirconium, hafnium, cerium, thorium, neodymium, uranium, neptunium, lutetium, samarium, plutonium, americium, and gadolinium.

The electrolytically reducible metallic contaminant is present as an ionizable compound or mixture of such compounds, generally constituting less than about 20% by weight of the total salt charged to the electrolysis cell on a dry basis. The term "electrolytically reducible" connotes an elemental metal having a standard oxidation potential of less than about +1.20 volts. In the feed solution the metallic contaminant consists of ions of one or more elemental metals having standard oxidation potentials below about +1.20 volts. As reported in the above cited handbook, these metals include gallium, indium, thallium, tin, lead, vanadium, niobium, chromium, molybdenum, selenium, tellurium, manganese, iron, cobalt, nickel, rhodium, palladium, platinum, copper, silver, gold, zinc, cadmium and mercury.

The anion of the salts to be purified, as well as the anionic counterpart of the metallic contaminant, may comprise an acid radical of a halogen acid, an acid radical of an inorganic oxyacid, or a carboxylic group. Exemplary anions, but by no means an exhaustive citation, include fluoride, chloride, bromide, iodine, sulfate, bisulfate, sulfite, bisulfite, nitrate, nitrite, phosphate, mono hydrogen phosphate, dihydrogen phosphate, formate, acetate, propionate, and butyrate radicals. In a preferred embodiment of the invention, the anions continued in the raw liquor feed will consist essentially of electrolytically stable or nonoxidizable, as well as non-reducible, radicals so that the only anodic reaction is that of the sacrificial anode going into solution and the only cathodic reaction is that of reduction of the contaminant metal whereby electric power consumption is minimized. By the same token it is preferred that the pH of the electrolyte—which comprises feed solution in the cathode compartment and cations resulting from anodic attack plus migratory feed anions in the anode compartment—be maintained neutral or acidic so that no appreciable oxidation of hydroxyl ions will occur at the anode as a secondary reaction competing with anode dissolution. In addition it is preferred that the feed solution will not be more acidic than a pH of about 1.0 in order to minimize hydrogen evolution at the cathode.

With the foregoing considerations in mind, it will be seen that this invention is particularly advantageous and economical with respect to the purification of commercially important salts such as potassium sulfate, sodium sulfate, magnesium sulfate, ammonium sulfate, aluminum sulfate, potassium nitrate, sodium nitrate, magnesium nitrate, ammonium nitrate, aluminum nitrate, potassium fluoride, sodium fluoride, magnesium fluoride, ammonium fluoride, and aluminum fluoride. Where a limited degree of anion oxidation is not objectionable, aqueous solutions of other salts may be purified by the instant technique: e.g., potassium chloride, sodium chloride, magnesium chloride, ammonium chloride, aluminum chloride, potassium bromide, sodium bromide, magnesium bromide, ammonium bromide, and aluminum bromide.

As above noted, the anode compartment of the cell contains a sacrificial metal anode. Numerous metals may be employed for this purpose. Primary requirements in the selection of a particular metal, apart from process economics, are that the anode metal not be rapidly and spontaneously hydrolyzable with water—thus eliminating from consideration the alkali metals and calcium, strontium and barium—and further that the metals shall not acquire an adhesive layer of metal oxide or insoluble metal salt, or possess an excessively high oxygen overvoltage with respect to the particular anolyte and current density utilized. Suitable sacrificial metal anodes may comprise, for example, beryllium, magnesium, iron, cobalt, nickel, copper, zinc, cadmium, mercury as well as mixtures, alloys and amalgams of two or more such metals. Of these, iron, magnesium and zinc are preferred because of low cost, wide availability and good reactivity in virtually all electrolytes. In addition, aluminum metal makes a highly satisfactory anode when the anolyte contains fluoride or chloride ions, but is less satisfactory when the anolyte anions consist essentially of sulfate or nitrate radicals. It is not necessary that the anode be formed of a homogenous material, and it may comprise an outer layer of electrolytically oxidizable metal supported by or plated upon an inner core of some other electrically conductive material which may itself be anodically inert as, for example, carbon, graphite, tantalum, and the like. In some situations it may be desirable to substitute a partially sacrificial electrode such as magnetic iron oxide in order to decrease the amount of iron sulfate produced.

It will frequently be advantageous to operate the electrolysis cell in such a manner that the anolyte constitutes a secondary product therefrom in addition to the purified salt solution withdrawn from the central compartment. Thus, where it is desired to produce a titania, zirconia, or vanadia sol, the anode will accordingly be constructed of titanium, zirconium, or vanadium metal. It will be appreciated that the instant electrolytic separation process may be advantageously employed in the production of alumina-titania, alumina-zirconia or alumina-vanadia catalysts and catalyst bases, conjunctively with an aluminum purifying process, wherein an impure aluminum salt solution is charged to the cathode compartment of the cell, the aluminum salt solution is electrorefined to ultrahigh purity, while simultaneously a titanium, zirconium or vanadium salt solution is produced in the anode compartment. The two salt solutions are separately withdrawn from the cell and may then be utilized in subsequent preparatory steps.

The cathode of the cell may be constructed of any suitable conductor, metallic or non-metallic, which is substantially chemically inert toward the catholyte and does not possess an excessively high hydrogen overvoltage with respect to the particular catholyte and current utilized. Appropriate cathodic materials include carbon, graphite, vanadium, chromium, manganese, molybdenum, tungsten, magnetic iron oxide, iron, cobalt, nickel, the platinum group metals including platinum and palladium, copper, silver, gold, and mercury. The cathode may comprise a material which is the same as, or different from, the metallic contaminant undergoing reduction thereat. For example, in the removal of iron from an aluminum sulfate solution, the cathode may comprise a gridwork of copper, upon which the iron will plate out. In one embodiment of this invention, the anode and the cathode are periodically interchanged whereby the metal contaminant which plates out upon the cathode subsequently serves as the sacrificial metal of the anode.

As above described, the electrolysis cell utilized in this invention is divided into anodic and cathodic compartments by a cation exclusion barrier and the cathodic compartment is subdivided into a central zone and a cathodic zone by means of a neutral semipermeable membrane interposed between the cation barrier and the cathode. These membranes or barriers, being well-known articles of commerce, require minimal discussion here. They are made of highly conductive ion exchange material or resins. Methods of making membranes are described in the literature, for example, in the article by Wyllie and Patnode, Journal of Physical and Colloid Chemistry, volume 54, pp. 204–226. Materials of high ionic conductivity and high ionic concentration are preferred, particularly polymeric materials, such as the various well-known exchange resins preferably having ionic concentrations of between 2 normal and 6 normal in water immersion. Membranes may be made from ion exchange resins by cementation of resin particles, beads or granules, of about 0.001 inch to about 0.020 inch diameter, with a water permeable cement having a porosity of the order of 10 A. to 200 A. pore size. The resin granules may also be bonded together in a manner well known in the art. Neutral membranes may be made of a porous material having a pore size of from about 10 A. to about 1000 A. when immersed in water. Cellophane or resin-impregnated porous paper, porous hard rubber, or thermoplastic of a porosity sufficiently high to give an electrolytic conductivity of the order of ½ to ⅕ that of an ionic solution upon immersion in the solution are satisfactory. The membrane materials may be shaped into various forms either during the process of manufacture or thereafter, as by molding or by machining. The membranes may have a unitary structure or they may be composition membranes wherein an active microporous layer is carried by a generally inactive macroporous layer or backing, disposed either as a thin layer bonded to the carrier or impregnated within the pores of the carrier. The membranes may also be made by impregnating cellophane or cellulose sheets or tightly woven cellulose cloth with ionic exchange material.

The process of this invention is illustrated in the accompanying diagrammatic drawing. For convenience the drawing will be described in relation to the removal of iron from an aluminum sulfate solution contaminated with ferric sulfate, it being understood that the invention is not limited to the separation of these particular compounds or to specific electrode materials or to the cell arrangement therein shown.

In the drawing the electrolysis cell, shown in sectional elevation, comprises a liquid-tight tank or vessel 1 the interior of which is divided by a cation exclusion membrane 2 and a neutral semipermeable membrane 3 into an anode compartment 6, an intermediate compartment 7 and a cathode compartment 8. Anode 4 and cathode 5 are formed of expanded metallic iron mesh; alternatively, these electrodes may be fabricated of perforated plates, solid sheets, screening, and the like. Raw liquid feed is continuously charged to cathode compartment 8 through conduit 9. Cathode 5 extends practically the full width and height of the effective transverse area of compartment 8 so that the liquid feed is assured of thorough contact with the cathode before passing on through barrier 3 into intermediate compartment 7. The purpose of neutral barrier 3 is to prevent contamination of the product with raw feed. Purified salt solution is withdrawn from intermediate compartment 7 through conduit 10.

The cell may be placed in operation by initially filling anode compartment 6 with ferric sulfate solution, compartment 7 with aluminum sulfate solution, and cathode compartment 8 with the raw feed. A D-C potential of suitable magnitude is applied to electrodes 4 and 5, and the raw feed, which comprises an aqueous salt solution containing a major amount of aluminum sulfate and a minor amount of ferric sulfate, is cut in through conduit 9. Ferric ions are reduced to metallic iron which deposits on cathode 5. Aluminum ions, sulfate ions, and water pass through barrier 3 into compartment 7 from which purified aluminum sulfate solution is withdrawn via outlet duct 10. Sulfate ions also migrate from compartment 7 through cation barrier 2 into anode compartment 6. Meanwhile at anode 4 a nearly equivalent amount of iron goes into solution. The electrolysis of the iron at the anode acts as the equivalent of a primary half-cell source of direct current and thereby reduces the electric potential required to operate the cell. The ferric ions liberated in the anodic compartment are prevented from contaminating the purified aluminum sulfate in the intermediate compartment by cation impervious barrier 2. The net result of anodic and cathodic reactions is that iron is plated out of the aluminum sulfate, giving an iron-free product, and pure ferric sulfate is generated in the anode compartment.

A preferred embodiment of this invention involves the limiting of anodic cation concentration in the anolyte. For example, at high ferric sulfate concentrations the anode reaction will be less that of iron going into solution and more the oxidation of hydroxyl ions to produce oxygen gas and hydrogen ions. This competing side reaction increases the power requirements of the electrolysis cell. In order to minimize power requirements, ferric sulfate may be intermittently or continuously withdrawn from anode compartment 6 through conduit 11, and the volume so withdrawn is replaced with water introduced through conduit 12. By this means the concentration of ferric ions in the anolyte may be controlled to any desired level, and may be made sufficiently low so that no appreciable electrolysis of water will occur therein. This technique of anolyte dilution and withdrawal will, of course, be employed whenever it is desired to produce a secondary product stream from the anode compartment, as, for example, where one wishes to manufacture titania, zirconia, or vanadia sols, as previously set forth, employing an anode of the corresponding metal.

The cell may be operated on a continuous basis by periodically interchanging the metallic iron electrodes, either before the anode becomes substantially disintegrated by electrolytic oxidation, or when the cathode has accumulated a sufficiently heavy deposit to make removal desirable, whichever first occurs. The iron coated cathode is removed, rinsed with water or dilute acid and used to replace the now partially consumed anode. Once the electrolysis cell is in full operation, iron need be added or removed only to compensate for differences in the efficiency of the anode and cathode and in the valence state of the cation in the feed and in the anode effluent solution.

The practice of the invention is further illustrated by the following specific example relating to the removal of iron contaminant from an aluminum sulfate solution using laboratory scale equipment:

Apparatus

An electrolysis cell generally similar in arrangement to that shown in the drawing is constructed of stacked methylmethacrylate spacers and plates held together by external compression bolts. The anode and cathode compartments are each approximately 4" x 4" in transverse cross-section x 1.5" deep in the direction normal to the membranes, and the central compartment is 4" x 4" in transverse cross-section x 0.5" deep in the direction normal to the membranes. The neutral semipermeable membrane separating the cathode compartment from the central compartment is a vinyl plastic diffusion membrane, such as Graver Hi-Sep or Nalfilm D-30; the effective free area of the membrane e.g., the area in contact with catholyte and central compartment liquid, measures 4" x 4". The cation impervious membrane separating the central compartment from the anode compartment is made of a mono-sheet of a quaternary type anion exchange resin, such as Nalfilm-2; its effective free area also measures 4" x 4". This membrane has a high internal concentration of cations and effectively bars the entrance of additional cations while permitting anions to pass through freely.

The anode and cathode are both constructed of rectangular iron screening approximately 20 mesh and formed of 18 gauge iron wire. The anode is disposed in a plane parallel to and spaced about 0.5" from the cation impervious membrane, and extends completely across the anode compartment. Likewise the cathode is disposed in a plane parallel to and spaced about 0.5" from the neutral membrane, and extends completely across the cathode compartment. The anode and cathode removably engage vertical slots in the sidewalls of their respective compartments so that they may be easily replaced or interchanged.

The liquid inlet to the cathode compartment comprises a pattern of 25 holes 1/16" in diameter drilled through the central 3.5" square portion of the endwall of the cathode compartment. A distributor housing provided with a single inlet at its bottom is attached to the external surface of said endwall and encloses all of the holes. These holes serve to distribute the raw liquor feed uniformly to and about the rear of the cathode. The liquid outlets from the anode compartment and central compartment are 0.25" drains connected by vinyl plastic tubing to constant level flow devices each set to maintain the liquid level in the respective compartment slightly above the top edge of the free area of the membrane.

Operation

The feed solution to be treated contains 28% by weight of $Al_2(SO_4)_3$ and 0.2% by weight of Fe, existing mostly as $Fe_2(SO_4)_3$. The pH of this solution is 3.2 and will therefore not cause excessive hydrogen evolution at the cathode. This solution is contained in a feed bottle elevated above the electrolysis cell and connected to the inlet distributor housing by 0.25" plastic tubing. All compartments are initially filled with this solution, which is thereafter introduced to the cell at a constant flow of 10 cc./min.

A DC supply of 4–7 volts, connected to the electrodes by #20 copper wire, is adjusted to maintain a current of 4.0 amperes which corresponds to approximately 40 ma./cm.$^2$ of cathode area. Higher current densities can be used if cell cooling is provided.

The initial relatively high iron concentration in the central compartment is gradually reduced as the cell is run. After two hours it has fallen to 100 p.p.m. and after four hours the product contains only 20 p.p.m. iron which is a hundred-fold reduction from the initial level.

The theoretical current required to remove 0.2% iron contamination at a flow of 10 cc./min. is about 2.3 amperes, indicating a current efficiency of about 57%. This high efficiency is due, in substantial measure, to the uniform flow pattern through the cathode which provides the cathode continuously with a solution of maximum iron content and prevents concentration polarization thereat.

As the electrolysis proceeds the anode compartment liquid acquires a deep orange color indicating extensive iron accumulation which is effectively prevented from contaminating the product by the cation impermeable membrane. A 30 cc. portion of distilled water is added to the anode compartment every 30 minutes in order to limit excessive buildup of iron in this compartment. Obviously the anolyte dilution may be carried out continuously. Substantially pure ferric sulfate may be removed from the anolyte overflow if desired.

Although only a single cell unit is shown in the drawing, it may often be desirable to cascade a plurality of similar cell units to form a multicell apparatus such that the electrolyte from the intermediate zone of each cell is charged to the cathodic zone of the next succeeding cell. In this manner, any desired degree of separation may be obtained which is relatively independent of cation barrier selectivities.

I claim as my invention:

1. A process for removing an electrolytically reducible metallic contaminant from a raw aqueous liquor containing a major proportion of electrolytically stable cations and a minor proportion of said contaminant in ionic form which comprises: maintaining spaced electrodes including a sacrificial metal anode and a cathode immersed in an aqueous electrolyte and separated by a first cation impervious barrier and a second neutral semipermeable barrier interposed between said first barrier and said cathode whereby to form anodic, intermediate and cathodic zones; introducing said raw liquor to the cathodic zone and passing it first into contact with the cathode and then through said second barrier into the intermediate zone; applying an electric potential to said electrodes thereby electrolytically reducing said contaminant to the metallic state in the cathodic zone and oxidizing said sacrificial anode in the anodic zone, the potential migration into said intermediate zone of cations thus liberated in the anodic zone being substantially impeded by said first barrier; and withdrawing from said intermediate zone purified liquor of reduced contaminant content.

2. The process of claim 1 wherein the concentration of cations liberated in the anodic zone is controlled by adding water thereto and withdrawing excess anolyte.

3. The process of claim 1 wherein both anode and cathode comprise an electrolytically oxidizable metal and these two electrodes are periodically interchanged.

4. A process for removing an electrolytically reducible metallic contaminant comprising principally iron from an aluminum salt solution containing a major proportion of aluminum ions and a minor proportion of said contaminant in ionic form which comprises: maintaining spaced metallic iron electrodes including anode and cathode immersed in an acidic aqueous electrolyte and separated by a first cation impervious barrier and a second neutral semipermeable barrier interposed between said first barrier and said cathode whereby to form anodic, intermediate and cathodic zones; introducing said aluminum salt solution to the cathodic zone and passing it first into contact with the cathode and then through said second barrier into the intermediate zone; applying an electric potential to said electrodes thereby plating out iron on the cathode and dissolving iron from the anode, the potential migration into said intermediate zone of iron ions thus liberated in the anodic zone being substantially impeded by said first barrier; and withdrawing from said intermediate zone purified aluminum salt solution of reduced contaminant content.

5. The process of claim 4 wherein said metallic iron electrodes are interchanged before the anode becomes substantially disintegrated by electrolytic oxidation.

6. The process of claim 4 wherein said aluminum salt is aluminum sulfate.

7. The process of claim 4 wherein said aluminum salt is aluminum chloride.

8. A process for separating iron from an aluminum salt solution containing a major proportion of aluminum ions and a minor proportion of iron ions which comprises: maintaining spaced metallic iron electrodes including anode and cathode immersed in an acidic aqueous electrolyte and separated by a first cation impervious barrier and a second neutral semipermeable barrier interposed between said first barrier and said cathode whereby to form anodic, intermediate and cathodic zones; introducing said aluminum salt solution to the cathodic zone and passing it first into contact with the cathode and then through said second barrier into the intermediate zone; applying an electric potential to said electrodes thereby plating out iron on the cathode and dissolving iron from the anode, the potential migration into said intermediate zone of iron ions thus liberated in the anodic zone being substantially impeded by said first barrier; withdrawing iron-containing anolyte from said anodic zone and replacing the volume withdrawn with water whereby to maintain the iron concentration of the anolyte sufficiently low so that no appreciable oxidation of hydroxyl ions occurs therein; and withdrawing from said intermediate zone purified aluminum salt solution of reduced iron content.

References Cited

UNITED STATES PATENTS

| | | | |
|---|---|---|---|
| 2,810,686 | 10/1957 | Bodamer et al. | 204—301 |
| 2,967,807 | 1/1961 | Osborne et al. | 204—129 |
| 3,072,545 | 1/1963 | Juda et al. | 204—113 |
| 3,124,520 | 3/1964 | Juda | 204—151 |

FOREIGN PATENTS

| | | |
|---|---|---|
| 857,850 | 1/1961 | Great Britain. |

JOHN H. MACK, *Primary Examiner.*

T. H. TUNG, *Assistant Examiner.*